United States Patent
Yao et al.

(10) Patent No.: US 11,474,388 B2
(45) Date of Patent: Oct. 18, 2022

(54) DISPLAY PANEL AND ROLLABLE DISPLAY DEVICE

(71) Applicant: SICHUAN LONGHUA FILM CO. LTD., Sichuan-Province (CN)

(72) Inventors: Po Hung Yao, Hsinchu (TW); Yao-Chang Wang, Hsinchu County (TW); Erh-Ming Hsieh, Taichung (TW)

(73) Assignee: SICHUAN LONGHUA FILM CO. LTD., Sichuan-Province (CN)

( * ) Notice: Subject to any disclaimer, the term of this patent is extended or adjusted under 35 U.S.C. 154(b) by 0 days.

(21) Appl. No.: 17/376,158

(22) Filed: Jul. 15, 2021

(65) Prior Publication Data

US 2022/0019104 A1    Jan. 20, 2022

(30) Foreign Application Priority Data

Jul. 15, 2020   (CN) .......................... 202010678473.2

(51) Int. Cl.
*G02F 1/1333*   (2006.01)
*G02F 1/1335*   (2006.01)
*F21V 8/00*   (2006.01)
*G02F 1/1368*   (2006.01)
*G02F 1/13363*   (2006.01)

(52) U.S. Cl.
CPC ....... *G02F 1/133305* (2013.01); *G02B 6/005* (2013.01); *G02B 6/0035* (2013.01); *G02F 1/1368* (2013.01); *G02F 1/133504* (2013.01); *G02F 1/133514* (2013.01); *G02F 1/133528* (2013.01); *G02F 1/133553* (2013.01); *G02F 1/133616* (2021.01); *G02F 1/133638* (2021.01); *G02F 2203/02* (2013.01)

(58) Field of Classification Search
CPC ......... G02F 1/133305; G02F 1/133616; G02F 1/133638; G02F 1/133528; G02F 1/133553; G02F 2202/02
USPC ............................................................ 349/42
See application file for complete search history.

(56) References Cited

U.S. PATENT DOCUMENTS

| | | | |
|---|---|---|---|
| 6,151,089 A * | 11/2000 | Yang .................. | G02F 1/133615 362/23.15 |
| 2008/0002112 A1* | 1/2008 | Lee .................... | G02F 1/133617 349/64 |
| 2021/0286323 A1* | 9/2021 | Patnaikuni ........... | G04G 17/045 |

* cited by examiner

*Primary Examiner* — Edward J Glick
*Assistant Examiner* — William D Peterson
(74) *Attorney, Agent, or Firm* — WPAT, P.C., Intellectual Property Attorneys; Anthony King (57) ABSTRACT

The present disclosure relates to a display panel. The display panel includes a first substrate, a second substrate, a display material layer, an active component layer, a color filter layer and a light source. The display material layer is disposed between the first substrate and the second substrate. The active component layer and the color filter layer are disposed between the first substrate and the display material layer. The light source is disposed on one side of the second substrate, and emits light. The light passes through the second substrate and the color filter layer and arrives at the first substrate, and is reflected by the first substrate and then enters the color filter layer. The light further passes through the color filter layer, enters the display material layer, passes through the display material layer, and is outputted to the exterior.

15 Claims, 7 Drawing Sheets

DISPLAY PANEL AND ROLLABLE DISPLAY DEVICE

BACKGROUND OF THE INVENTION

Field of the Invention

The present invention relates to a display panel and a rollable display device, and more particularly to a reflective display panel and a rollable display device applying the reflective display panel.

Description of the Prior Art

A reflective display displays an image by means of reflecting light from an ambient environment, and itself does not produce any light. Thus, a user using a reflective display can read as if reading from a piece of paper or from a book, and is avoided from visual fatigue or retina damage although the reflective display is used for an extend period of time. However, under an inadequate light source in the ambient environment or uncoordinated hues, defects such as insufficient brightness, reduced contrast and color saturation variation in a display image of a reflective display are incurred. Therefore, it is a vital task to improve such reflective display.

SUMMARY OF THE INVENTION

It is an object of the present invention to provide a display panel and a rollable display device applying the display panel, which include structures of a built-in light source and a light guide layer, so as to improve the application of the display panel under an inadequate light source in an ambient environment.

According to some embodiments of the present disclosure, a display panel includes a first substrate, a second substrate, a display material layer, an active component layer, a color filter layer and a light source. The second substrate is opposite to the first substrate. The display material layer is disposed between the first substrate and the second substrate. The active component layer and the color filter layer are disposed between the first substrate and the display material layer. The light source is disposed on one side of the second substrate, and the light source is configured to emit light. The light passes through the second substrate and the color filter layer and arrives at the first substrate, and is reflected by the first substrate and enters the color filter layer. The light further passes through the color filter layer, enters the display material layer, passes through the display material layer and is outputted to the exterior.

According to some embodiments of the present disclosure, the second substrate includes a light guide layer and a polarizing layer. The light guide layer includes a first surface and a second surface, wherein the first surface is close to the first substrate. The polarizing layer is disposed on the first surface of the light guide layer.

According to some embodiments of the present disclosure, the light guide layer includes a phase difference delay characteristic, wherein an out-plane optical phase delay value (Rth) and an in-plane optical phase delay value (Ro) of the light guide layer are more than 0 and less than or equal to ½ wavelength.

According to some embodiments of the present disclosure, an included angle between the axial of a slow axis of the light guide layer and the axial of a polarizing axis of the polarizing layer is more than 0 degree and less than 90 degrees.

According to some embodiments of the present disclosure, the light guide layer includes a ¼-wavelength retardation layer.

According to some embodiments of the present disclosure, after the light passes through the display material layer, the light passes through the polarizing layer to become a linearly polarized light. The linearly polarized light passes through the light guide layer to become circularly polarized light, which is outputted to the exterior.

According to some embodiments of the present disclosure, the light polarizing layer includes a linear polarizing plate.

According to some embodiments of the present disclosure, the second substrate further includes a microstructure layer, which is disposed on at least one of the first surface and the second surface or on the combination thereof.

According to some embodiments of the present disclosure, a difference between refractive indices of the microstructure layer and the light guide layer is more than 0 and less than or equal to 0.65.

According to some embodiments of the present disclosure, the second layer further includes a surface function layer, which is disposed on the second surface of the light guide layer.

According to some embodiments of the present disclosure, the surface function layer includes an anti-reflective coating and an anti-wear coating.

According to some embodiments of the present disclosure, the active component layer includes at least one transistor unit, and the transistor unit has an open area therein.

According to some embodiments of the present disclosure, the color filter layer includes at least one color filter unit, which is disposed in the open area.

According to some embodiments of the present disclosure, the display panel further includes a diffuse reflective layer. The diffuse reflective layer includes at least one diffuse reflecting unit, which is disposed in the open area.

According to some embodiments of the present disclosure, the display material layer includes liquid crystal and electro-attractive micro-particulate materials.

According to some embodiments of the present disclosure, a rollable display device includes a display panel, a roller and a housing. The display panel is disposed between the roller and the housing.

The display panel of the present invention is built-in with a light source, and so light can be fully supplemented in a timely manner in case of inadequate ambient light and the display effect of the display panel can be enhanced. Moreover, with the design of the second substrate having a phase difference delay characteristic, emitted light from the display panel of the present invention can be adjusted to conditions more suitable for viewing of a user. Further, because the second substrate simultaneously serves as a package cover plate and a light guide layer, the display panel of the present invention can be made thinner and lighter while providing a more simplified manufacturing process.

DETAILED DESCRIPTION OF THE EMBODIMENTS

Numerous embodiments or examples are provided in the disclosure below for enablement of implementation of different features of the present disclosure. The specific examples of the components and configurations in the literature below are for simplifying the present disclosure. It can be conceived that the description is merely illustrative and is not intended to be construed as limitations to the present disclosure. For example, in the description below, forming a first feature on or above a second feature may include mutual direct contact of the first and second features in some embodiments, or may include an additional component formed between the first and second features in some embodiments such that the first and second features may not be in direct contact. In addition, component denotations and/or numerals may be repeatedly used in multiple embodiments of the present disclosure. Such repeated use is based on objects of clarity and conciseness, and does not represent relations of the different embodiments and/or configurations discussed.

Moreover, it can be understood that when a component is "connected to" or "coupled to" another component, the component may be directly connected or coupled to the another component, or another intermediate component may exist in between.

Further, relative spatial terms such as "below", "under", "lower than", "on", "above" and the like used herein may be for the purpose of better describing the relation of a component depicted in the drawing relative to another or multiple components or features. In addition to representing the orientation depicted in the drawing, these relative spatial terms further cover multiple different orientations of a device in use or in operation; for example, a display panel may be placed in another orientation (e.g., rotated by 90 degrees or in another orientation), and these relative spatial terms should then be interpreted correspondingly.

In the present disclosure, for example, terms such as "first", "second" and "third" are used to describe various components, devices, areas, layers and/or blocks; however, these components, devices, areas, layers and blocks are not limited by these terms. These terms may be used to merely distinguish one component, device, area, layer or block from another component, device, area, layer or block. Unless otherwise clearly specified in the description, the terms "first", "second" and "third" used in the literature are not to be construed as an indication of a sequence or order.

Although numerical value ranges and parameters for defining broader ranges of the present application are all approximate numerical values, related numerical values in the specific embodiments are expressed as accurately as possible. However, any numerical value essentially and unavoidably includes standard deviations caused by individual test methods. Herein, the term "approximately" usually refers to that an actual numerical value is within positive/negative 10%, 5%, 1% or 0.5% of a specific numerical value or range, depending on the consideration of a person skilled in the technical field pertinent to the present application. It can be understood that, in additional experimental examples, or unless otherwise clearly stated, all ranges, quantities, numerical values and percentages (for example, for describing material contents, time duration, temperature, operation conditions, quantitative ratio and the like) are modified by "approximately". Thus, unless stated otherwise, the numerical values and parameters disclosed by the detailed description and the appended claims are all approximate numerical values, and may be varied according to requirements. Herein, when a numerical value range is expressed as from one end point to another end point or as between two end points, such numerical value range includes the end points, unless otherwise stated.

Figure 1:
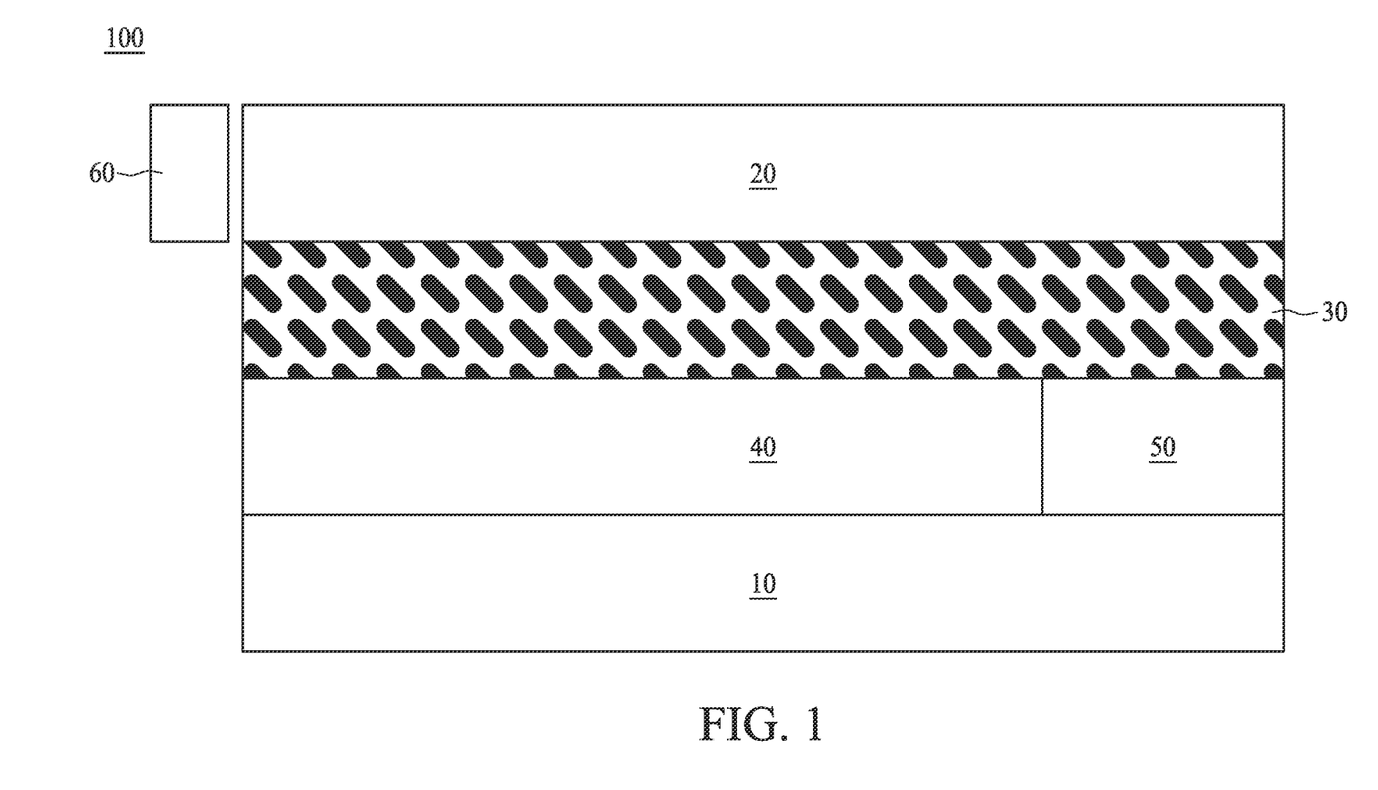
FIG. 1 is a section schematic diagram of a display panel according to some embodiments of the present invention.

Referring to FIG. 1, FIG. 1 shows a section schematic diagram of a display panel according to some embodiments of the present invention. As shown in FIG. 1, a display panel 100 may be a reflective display panel. The display panel 100 includes a first substrate 10 and a second substrate 20 opposite to the first substrate 10. In this embodiment, the first substrate 10 and the second substrate 20 may be, for example but not limited to, flexible substrates. The first substrate 10 and the second substrate 20 may include, for example but not limited to, polymeric materials, such as polyamide (PI) or polyethylene terephthalate (PET). The thicknesses of the first substrate 10 and the second substrate 20 may be within a range between 0.05 mm and 0.8 mm, and preferably, for example but not limited to, within a range of 0.5 mm.

The display panel 100 further includes a display material layer 30, which is disposed between the first substrate 10 and the second substrate 20. The first substrate 10 and the second substrate 20 sandwich the display material layer 30. In some embodiments, the display material layer 30 may include liquid crystal materials, electronic ink materials, electrophoresis materials or electro-attractive micro-particulate materials. The display panel 100 may further include a moisture separating layer (not shown).

As shown in FIG. 1, the display panel 100 may include a color filter layer 40 and an active component layer 50. In some embodiments, the color filter layer 40 and the active component layer 50 are disposed on the same side of the first substrate 10 or the second substrate 20. In some embodiments, the active component layer 50 and the color filter layer 40 may be disposed between the first substrate 10 and the display material layer 30.

Figure 2:
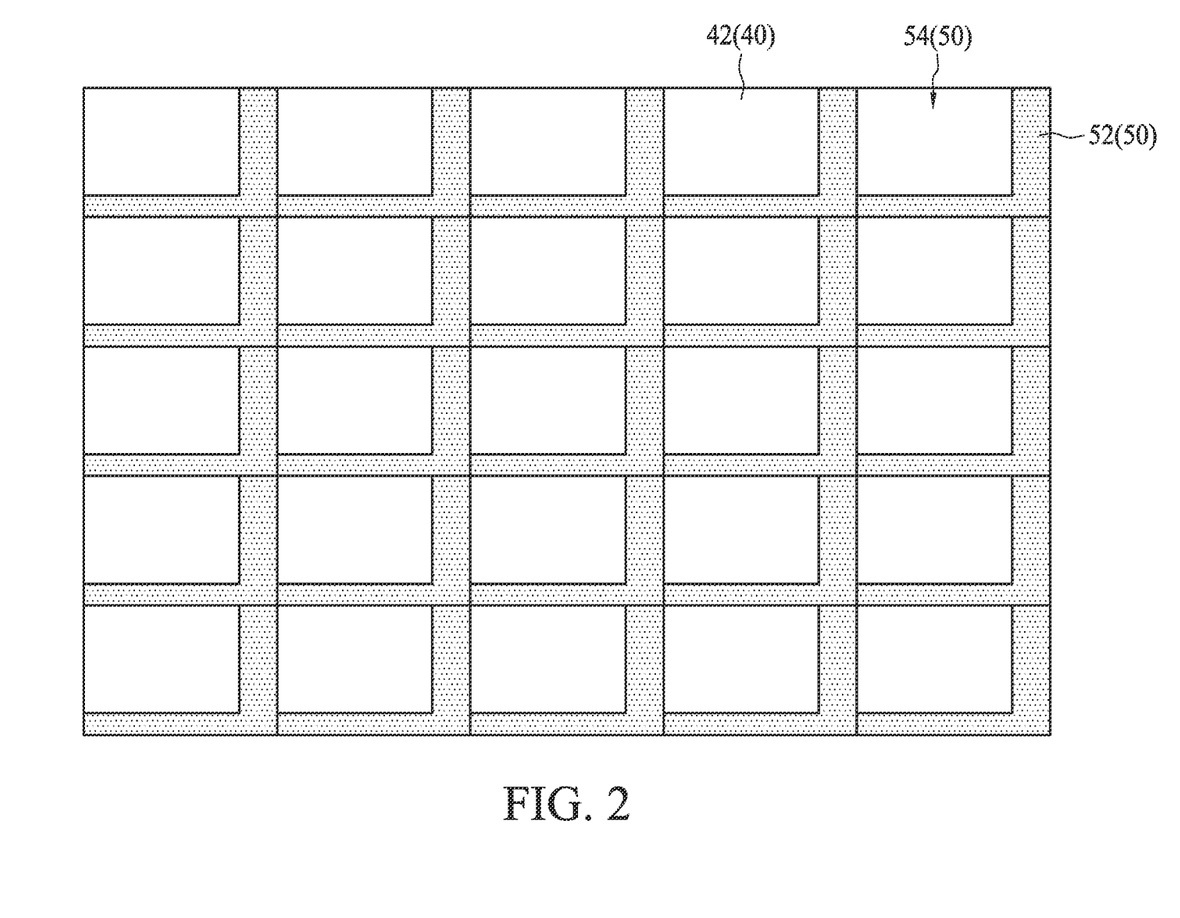
FIG. 2 is a top schematic diagram of a first substrate according to some embodiments of the present invention.

FIG. 2 shows a top schematic diagram of a first substrate according to some embodiments of the present invention. As shown in FIG. 1, the active component layer 50 may be disposed on the first substrate 10, and includes at least one transistor unit 52. The transistor unit 52 may include an array of organic or inorganic sensor components to serve as an electrical switch. Each transistor unit 52 has an open area 54 therein. The color filter layer 40 may include at least one color filter unit 42, which is disposed in the open area 54 of the transistor unit 52. In some embodiments, the color filter unit 42 may partially overlap with the transistor unit 52. In some embodiments, the color filter unit 42 may include a blue filter unit, a red filter unit and a green filter unit.

In this embodiment, since the color filter layer 40 is disposed on the first substrate 10, the first substrate 10 shown in FIG. 1 and FIG. 2 and a film layer formed on the first substrate 10 may also be referred to as a color filter substrate. The color filter unit 42 is disposed in a pixel region in the open area 54 of the first substrate 10 to form a structure of a color filter on array (COA). Further, according to a preferred embodiment, a light shielding pattern layer (not shown) is further included in the color filter unit 42, and may be referred to as a black matrix (BM).

Figure 3:
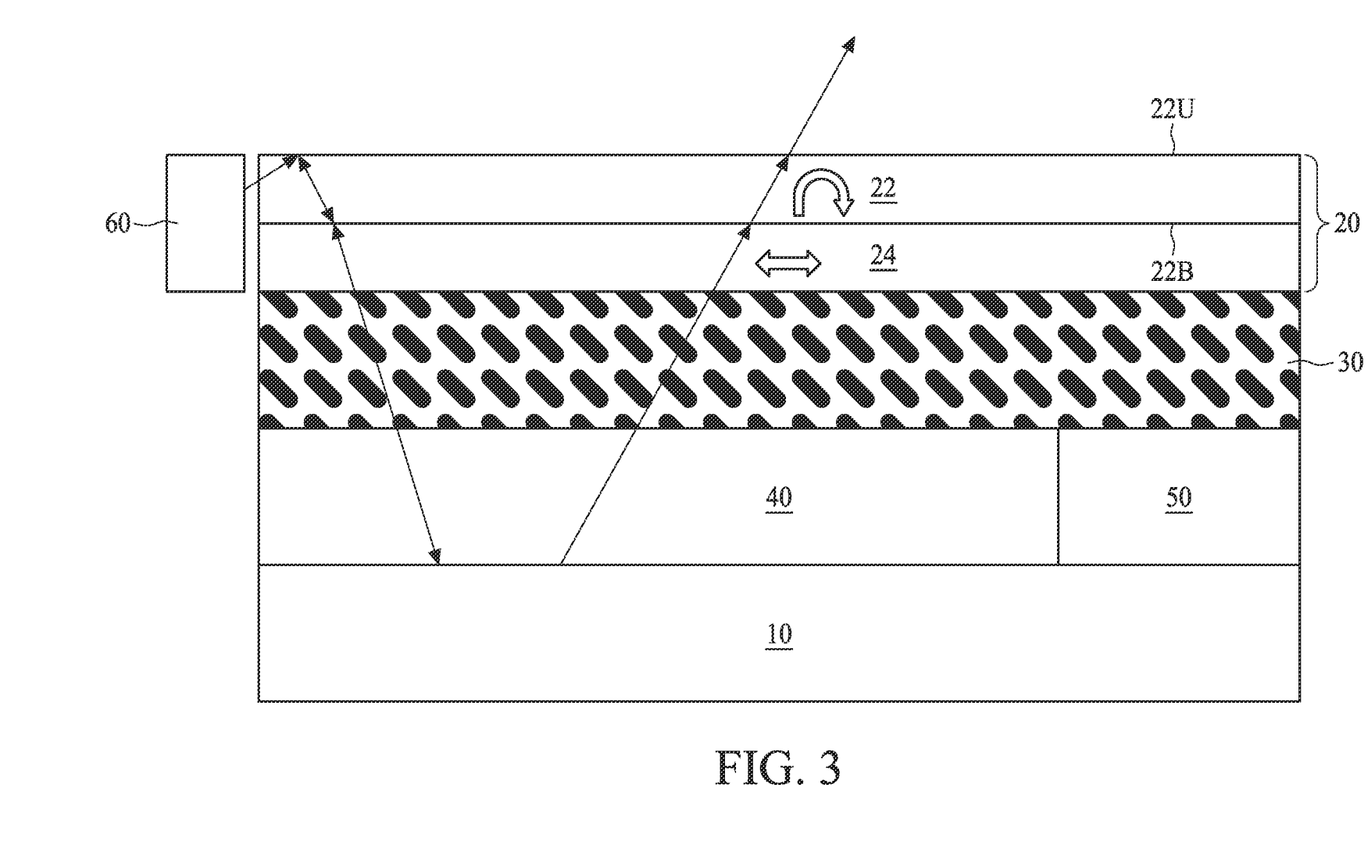
FIG. 3 is a section schematic diagram of a display panel according to some embodiments of the present invention.

FIG. 3 shows a section schematic diagram of a display panel according to some embodiments of the present invention. As shown in FIG. 3, the display panel 100 further includes a light source 60, which is disposed on one side of the second substrate 20. In some embodiments, the light source 60 is disposed adjacent to the second substrate 20. The light source 60 may include a light-emitting diode or other light-emitting materials. The light source 60 may be used to emit light, light energy or light beams. In some embodiments, the light passes through the second substrate 20 and the color filter layer 40 and arrives at the first substrate 10, and is reflected by the first substrate 10 and enters the color filter layer 40. The light further passes through the color filter layer 40, enters the display material layer 30, passes through the display material layer 30, and is outputted to the exterior.

The application of the display panel 100 may be enhanced by providing the light source 60 in the display panel 100. Specifically, under an inadequate light source in the ambient environment or uncoordinated hues, the external light source received by the display panel 100 is insufficient to display an image, and thus defects such as insufficient brightness, reduced contrast and color saturation variation in the display image are incurred. The light source 60 can fully compensate for the insufficient ambient light, and so the display panel 100 is still able to clearly display the image under the insufficient ambient light. Therefore, the light source 60 provided is capable of effectively reducing interfering factors of the ambient light.

In some embodiments, the second substrate 20 may include a light guide layer 22. The light guide layer 22 includes a first surface 22B and a second surface 22U, wherein the first surface 22B is close to the first substrate 10. The light guide layer 22 may include a component plastic material. In some embodiments, the light guide layer 22 may include polymethylmethacrylate (PMMA), polycarbonate (PC), cyclo olefin polymer (COP) or other appropriate materials.

The light guide layer 22 may receive light from the light source 60, and transmit the light from the light source 60 onto the first substrate 10. In some embodiments, the light guide layer includes a phase difference delay characteristic, wherein an out-plane optical phase delay value (Rth) and an in-plane optical phase delay value (Ro) of the light guide layer are more than 0 and less than or equal to ½ wavelength. In some embodiments, the light guide layer 22 may include a ¼-wavelength retardation layer.

Again referring to FIG. 3, the second substrate 20 may include a polarizing layer 24, which is disposed on the first surface 22B of the light guide layer 22. The polarizing layer 24 may be disposed between the light guide layer 22 and the display material layer 30. In some embodiments, the polarizing layer 24 may include a linear polarizing plate. In some embodiments, an included angle between the axial of the slow axis of the light guide layer 22 and the axial of the polarizing axis of the polarizing layer 24 is more than 0 degree and less than 90 degrees. Further, according to a preferred embodiment, the included angle between the axial of the slow axis of the light guide layer 22 and the axial of the polarizing axis of the polarizing layer 24 is 45 degrees. Thus, after the light from the light source 60 passes through the display material layer 30, the light first passes through the polarizing layer 24 to become linearly polarized light. The linearly polarized light then passes through the light guide layer 22 to become circularly polarized light, which is the final form outputted to the exterior. Specifically, the light from the light source 60 first passes through the light guide layer 22, then passes through the polarizing layer 24, and enters the display material layer 30. Then, the light passes through the second substrate 20 and the color filter layer 40 and arrives at the first substrate 10, and is reflected by the first substrate 10 and enters the color filter layer 40. The light further passes through the color filter layer 40, and enters the display material layer 30. Then, the light passes through the display material layer 30, becomes the linearly polarized light through the polarizing layer 24, becomes the circularly polarized light through the light guide layer 22, and is outputted to the exterior.

In general, when a user wears special glasses (e.g., polarizing glasses), there is a chance that an image on a display panel cannot be clearly viewed due to the possibility that the polarizing axis of the polarizing glasses worn is different from the polarization direction of the emitted light from the display panel, resulting in unsatisfactory viewing quality. In this embodiment, since the display panel 100 includes the light guide layer 22 having a phase difference delay characteristic, the polarization direction of the light emitted from the display panel 100 can be adjusted. The emitted light from the display panel 100 may be in a circularly polarized form, and so the image of the display panel 100 can be clearly viewed regardless of the direction of the polarizing axis of the glasses worn by the user. Therefore, the user can obtain better viewing quality in contribution to the display panel 100. Further, the second substrate 20 of the present invention simultaneously serves as a package cover plate and the light guide layer 22, and so the display panel 100 of the present invention can become thinner and lighter while providing a simplified manufacturing process.

The display panel of the present invention is not limited by the embodiments above. Other embodiments or variation embodiments of the present invention are given in the description below. However, to keep the description simple and to emphasize differences between the embodiments or variation embodiments, the same numerals are used to denote the same components, and so the repeated parts are omitted herein for brevity.

Figure 4A:
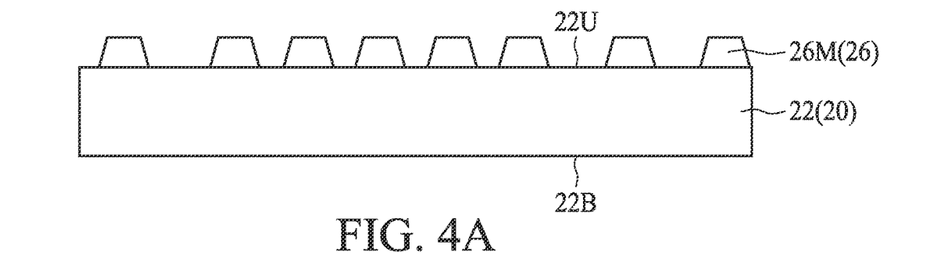
FIGS. 4A to 4C are section schematic diagrams of a second substrate according to some embodiments of the present invention.
Figure 4B:
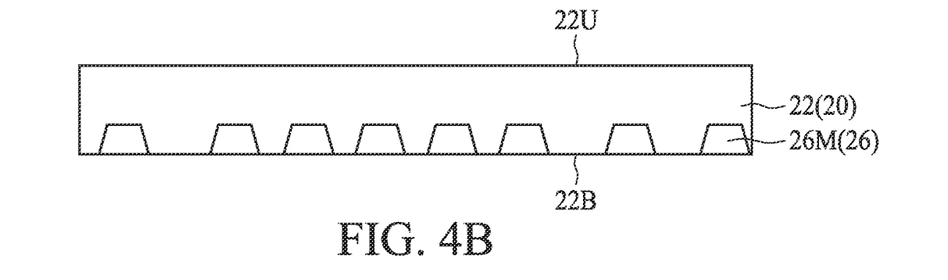
Figure 4C:
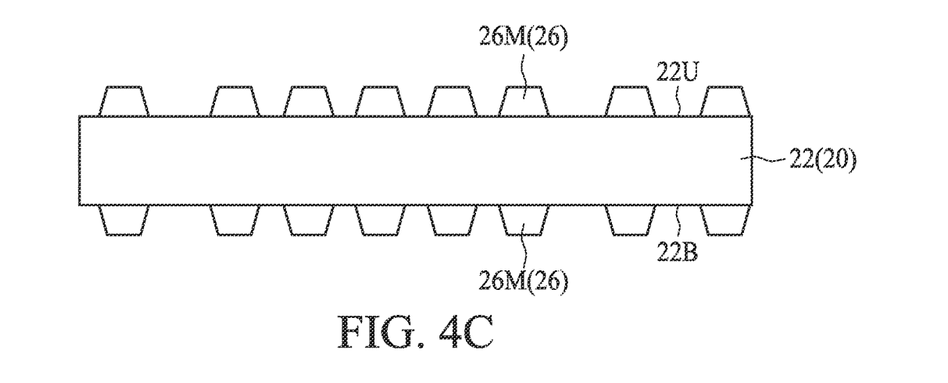

FIGS. 4A to 4C show section schematic diagrams of a second substrate according to some embodiments of the present invention. In some embodiments, the second substrate 20 further includes a microstructure layer 26. The microstructure layer 26 provides incoming light with uniform scattering. The microstructure layer 26 may be disposed on at least one of the first surface 22B and the second surface 22U of the light guide layer 22, or on the combination thereof. A difference between refractive indices of the microstructure layer 26 and the light guide layer 22 may be more than 0 and less than or equal to 0.65. The microstructure layer 26 may include at least one microstructure unit 26M. In some embodiments, the size of the microstructure unit 26M may be less than or equal to 30 μm.

In some embodiments, the microstructure unit 26M may be distributed on the light guide layer 22. In some embodiments, the microstructure unit 26M may be distributed in a non-uniform density distribution on the light guide layer 22. For example, as shown in FIG. 4A, the microstructure unit 26M may be in a scattered distribution on an edge of the second substrate 20, and may be in a dense distribution on the center of the second substrate 20; however, the present invention is not limited to the above.

In some embodiments, the microstructure unit 26M may have a sloped surface. In some embodiments, the shape of a cross section of the microstructure unit 26M includes a trapezoid, a triangle, a cylinder and a parabola; however, the present invention is not limited thereto, and the shape of the cross section of the microstructure unit 26M may be in any shape as desired. In some embodiment, the three-dimensional shape of the microstructure unit 26M includes a cone, a pyramid, a disc and a cannonball; however, the present invention is not limited thereto, and the three-dimensional shape of the microstructure unit 26M may include any shape as desired.

As shown in FIG. 4A, the microstructure layer 26 may be disposed on the second surface 22U, and is a protruding structure relative to the second surface 22U; however, the present invention is not limited thereto. In some embodiments, the microstructure layer 26 may be disposed on the first surface 22B, and is a protruding structure relative to the first surface 22B.

As shown in FIG. 4B, the microstructure layer 26 may be disposed on the first surface 22B, and is a recessed structure relative to the first surface 22B; however, the present invention is not limited thereto. In some embodiments, the microstructure layer 26 may be disposed on the second surface 22U, and is a recessed structure relative to the second surface 22U.

As shown in FIG. 4C, the microstructure layer 26 may be simultaneously disposed on the first surface 22B and the second surface 22U, and is a protruding structure relative to the first surface 22B and the second surface 22U; however, the present invention is not limited thereto. In some embodiments, the microstructure layer 26 may be disposed on the first surface 22B and the second surface 22U, and is a recessed structure relative to the first surface 22B and the second surface 22U.

Figure 5A:
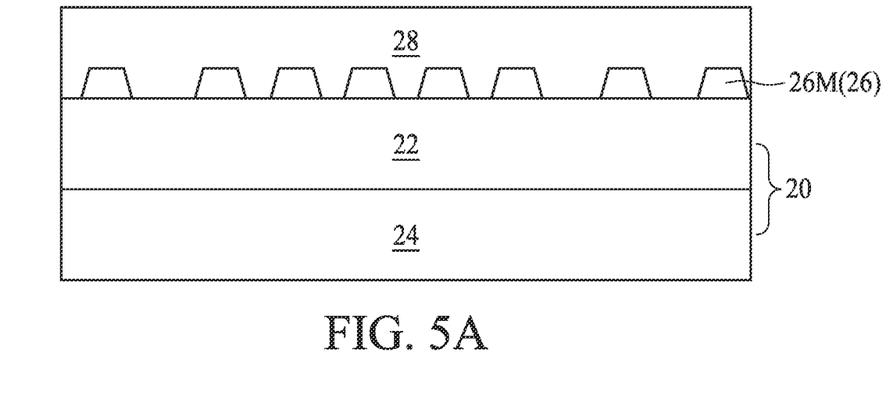
FIGS. 5A and 5B are section schematic diagrams of a second substrate according to some embodiments of the present invention.
Figure 5B:
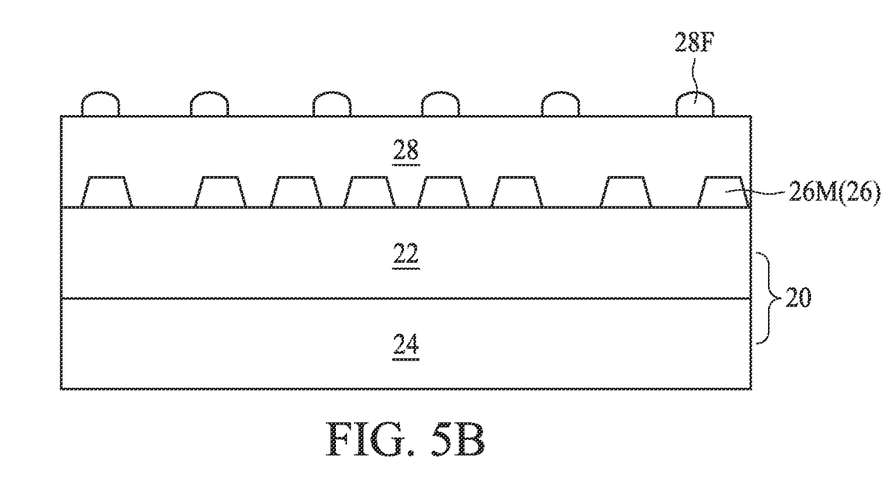

FIGS. 5A and 5B show section schematic diagrams of a second substrate according to some embodiments of the present invention. As shown in FIG. 5A, the second substrate 20 may further include a surface function layer 28, which is disposed on the second surface 22U of the light guide layer 22. In some embodiments, the surface function layer 28 may include an anti-reflective coating or an anti-wear coating. As shown in FIG. 5B, the surface function layer 28 may include at least one surface function unit 28F, and the size of the surface function unit 28F may be between 50 nm and 350 nm. In some embodiments, the surface function layer 28 and the surface function unit 28F may be an integral or separate design.

In some embodiments, the surface function layer 28 may include a UV absorbent material. In some embodiments, the surface function layer 28 may include a diffusion layer (not shown), which may be disposed on a lower surface of the surface function layer 28. The diffusion layer may include a plurality of diffusion patterns, wherein the size of the diffusion patterns may be less than 15 μm; however, the present invention is not limited thereto.

In some embodiments, the second substrate 20 may further include a transparent conductive layer (not shown). The transparent conductive layer may include a touch sensing function. In some embodiments, the transparent conductive layer may be a patterned transparent conductive layer. The transparent conductive layer may be disposed below the polarizing layer 24 or above the surface function layer 28; however, the present invention is not limited thereto.

Figure 6:
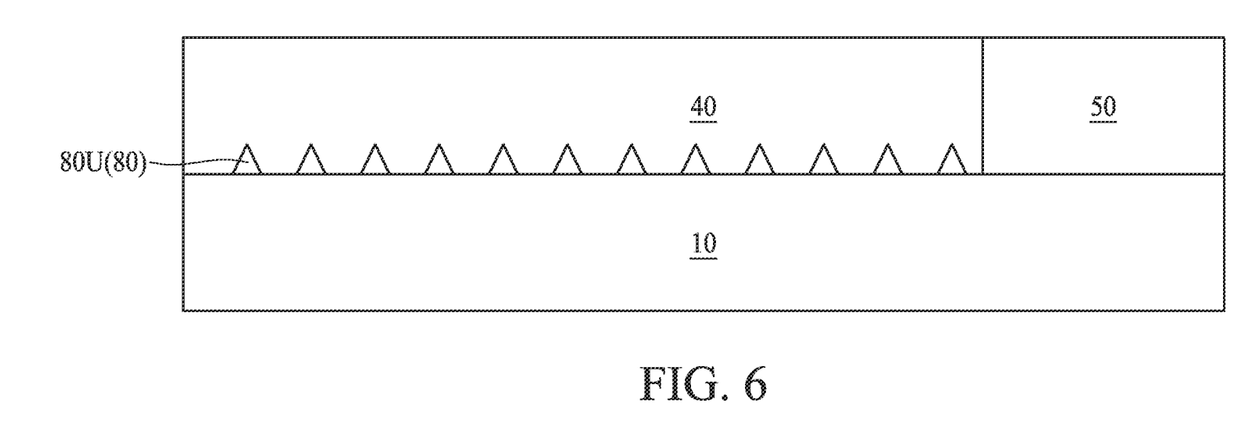
FIG. 6 is a section schematic diagram of a first substrate according to some embodiments of the present invention.

FIG. 6 shows a section schematic diagram of a first substrate according to some embodiments of the present invention. The display panel 100 may further include a diffuse reflection layer 80. The diffuse reflection layer 80 provides incoming light with uniform scattering and reflection, so as to enhance the display effect of the display panel 100. In some embodiments, the diffuse reflection layer 80 includes at least one diffuse reflection unit 80U, which may be disposed in the open area 54 of the first substrate 10. In some embodiments, adjacent diffuse reflection units 80U may have a height difference in between, wherein the height difference is more than 500 nm. In some embodiments, the height difference between adjacent diffuse reflection units 80U may be less than 10 μm. The diffuse reflection units 80U in the same open area 54 may have different sizes or the same size. The diffusion reflection unit may be shaped as a rectangle, a circle or an irregular shape; however, the present invention is not limited thereto. Preferably, the diffuse reflection units 80U may be shaped as at least one of trapezoids and circles, or the combination of the two. The diffuse reflection units 80U may individually have different shapes. In some embodiments, the color filter unit 42 may be disposed on the diffuse reflection unit 80U.

Figure 7A:
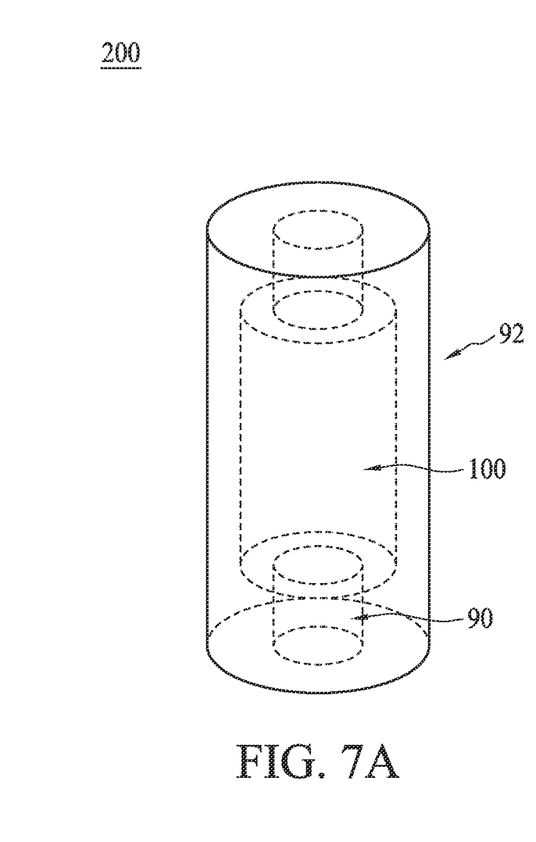
FIGS. 7A and 7B are schematic diagrams of a rollable display device according to some embodiments of the present invention.
Figure 7B:
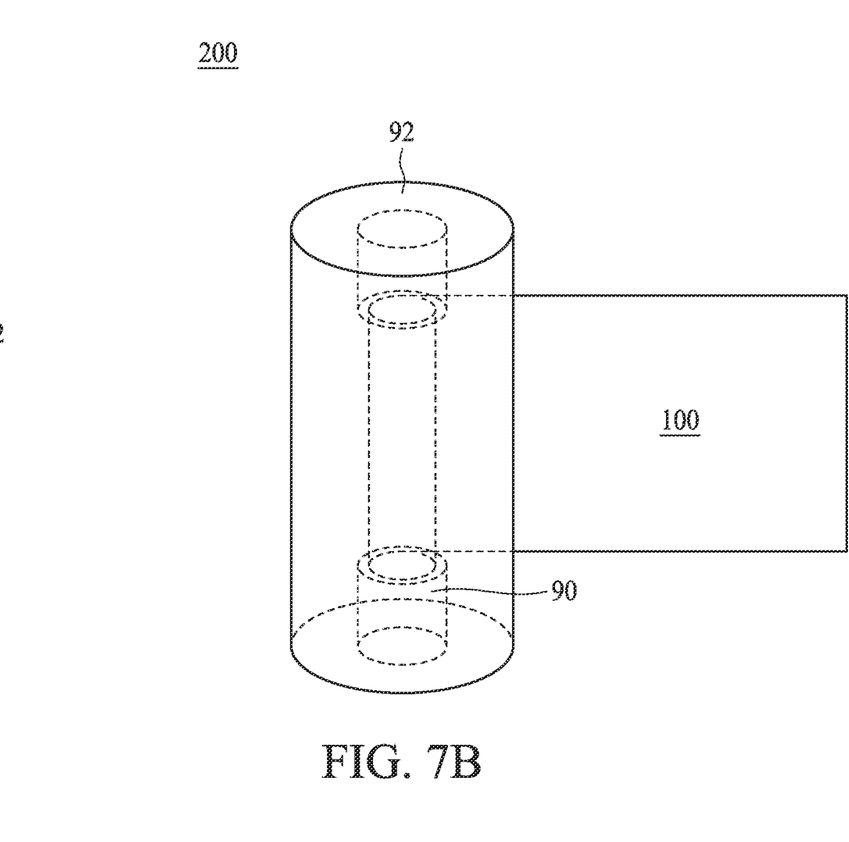

FIGS. 7A and 7B are schematic diagrams of a rollable display device according to some embodiments of the present invention. FIG. 7A shows a schematic diagram of a rollable display device in a winded state according to some embodiments of the present invention; FIG. 7B shows a schematic diagram of a rollable display device in an extended state according to some embodiments of the present invention. The present invention further provides a rollable display device (also known as flexible display device, foldable display device or reel display device) 200 including the foregoing display panel 100. The rollable display device 200 may include a roller 90 and a housing 92. The display panel 100 is disposed between the roller 90 and the housing 92. In a winded state, as shown in FIG. 7A, the display panel 100 is winded around the roller 90. In an extended state, as shown in FIG. 7B, the display panel 100 is pulled out from an opening (not shown) of the housing 92, and is extended as a plane.

In some embodiments, the rollable display device 200 may further include a winding/unwinding module and a positioning module. In some embodiments, the winding/unwinding module includes the foregoing roller 90, a gear set and a driver motor. In some embodiments, the positioning module includes a positioning groove or a magnetic positioning component; however, the present invention is not limited thereto.

In conclusion of the above, the display panel of the present invention is built-in with a light source, and so light can be fully supplemented in a timely manner in case of inadequate ambient light and the display effect of the display panel can be enhanced. Moreover, with the design of the second substrate having a phase difference delay characteristic, emitted light from the display panel of the present invention can be adjusted to conditions more suitable for viewing of a user. Further, because the second substrate simultaneously serves as a package cover plate and a light guide layer, the display panel of the present invention can be made thinner and lighter while providing a more simplified manufacturing process.

Preferred embodiments of the present invention are described as above. All equivalent changes and modifications made to the claims of the present invention are to be encompassed within the scope of protection of the present invention.

What is claimed is:

1. A display panel, comprising:
   a first substrate and a second substrate opposite to the first substrate, wherein the second substrate comprises a light guide layer and a polarizing layer, the light guide layer has a first surface and a second surface, the first surface is close to the first substrate, and the polarizing layer is disposed on the first surface of the light guide layer;
   a display material layer, disposed between the first substrate and the second substrate wherein the display material layer directly physically contacts the second substrate;
   an active component layer and a color filter layer, disposed between the first substrate and the display material layer; and
   a light source, disposed on one side of the second substrate, wherein the light source is configured to emit light;
   wherein the light passes through the second substrate and the color filter layer and arrives at the first substrate, and is reflected by the first substrate and enters the color filter layer;
   the light further passes through the color filter layer, enters the display material layer, passes through the display material layer and is outputted to an exterior.

2. The display panel according to claim 1, wherein the light guide layer comprises a phase difference delay characteristic, an out-plane optical phase delay value (Rth) and an in-plane optical phase delay value (Ro) of the light guide layer are more than 0 and less than or equal to ½ wavelength.

3. The display panel according to claim 2, wherein an included angle between an axial of a slow axis of the light guide layer and an axial of a polarizing axis of the polarizing layer is more than 0 degree and less than 90 degrees.

4. The display panel according to claim 2, wherein the light guide layer comprises a ¼ wavelength retardation layer.

5. The display panel according to claim 2, wherein after the light passes through the display material layer, the light passes through the polarizing layer to become linearly polarized light, the linearly polarized light passes through the light guide layer to become circularly polarized light, and the circularly polarized light is outputted to the exterior.

6. The display panel according to claim 1, wherein the polarizing layer comprises a linear polarizing plate.

7. The display panel according to claim 1, wherein the second substrate further comprises a microstructure layer, and the microstructure layer is disposed on at least one of the first surface and the second surface or on a combination thereof.

8. The display panel according to claim 7, wherein a difference between refractive indices of the microstructure layer and the light guide layer is more than 0 and less than or equal to 0.65.

9. The display panel according to claim 7, wherein the second substrate further comprises a surface function layer, and the surface function layer is disposed on the second surface of the light guide layer.

10. The display panel according to claim 9, wherein the surface function layer comprises an anti-reflective coating or an anti-wear coating.

11. The display panel according to claim 1, wherein the active component layer comprises at least one transistor unit, and the transistor unit has an open area therein.

12. The display panel according to claim 11, wherein the color filter layer comprises at least one color filter unit, and the color filter unit is disposed in the open area.

13. The display panel according to claim 11, further comprising:
   a diffuse reflection layer, comprising at least one diffuse reflection unit, the diffuse reflection unit being disposed in the open area.

14. The display panel according to claim 1, wherein the display material layer comprises liquid crystal and electro-attractive micro-particulate materials.

15. A rollable display device, comprising:
   the display panel of claim 1;
   a roller; and
   a housing;
   wherein the display panel is disposed between the roller and the housing.